United States Patent

[11] 3,550,884

| [72] | Inventor | Waldemar Moeller |
| | | Heligenberg, Baden, Germany |
| [21] | Appl. No. | 700,140 |
| [22] | Filed | Jan. 24, 1968 |
| [45] | Patented | Dec. 29, 1970 |
| [73] | Assignee | Bodenseewerk Geraetetechnik, G.m.b.H. |
| | | Bodensee, Germany |
| | | a corporation of Germany |
| [32] | Priority | Feb. 2, 1967 |
| [33] | | Germany |
| [31] | | No. F51425 |

[54] AUTOPILOT
6 Claims, 6 Drawing Figs.

[52] U.S. Cl. .................................................. 244/77
[51] Int. Cl. .................................................. B64c 13/18
[50] Field of Search .......................................... 244/77, 77A, 77E, 77C, 76, 78, 79

[56] References Cited
UNITED STATES PATENTS
2,834,562  5/1958  Jude et al. ...................... 244/77
2,896,883  7/1959  Andeen .......................... 244/77
2,961,202  11/1960 Summerlin ....................... 244/77
3,052,428  9/1962  Henry et al. ..................... 244/77

Primary Examiner—Milton Buchler
Assistant Examiner—Jeffrey L. Forman
Attorney—Edward R. Hyde, Jr.

ABSTRACT: An autopilot for controlling the turn of an aircraft at relatively high speed includes a command transmitter for generating a rate of turn signal indicative of the desired aircraft rate of turn. This signal is applied to a torque motor acting on a gyroscope having a response axis disposed in the direction of the yaw axis for the aircraft. The gyroscope generates an error signal indicative of the deviation between the actual rate of turn of the aircraft and the desired rate of turn. A signal is applied to the aileron control channel. Thus, the initiation of a turn is effected by the aileron but in a closed servoloop whereby the rate of turn can be determined accurately and independently of the flight speed.

AUTOPILOT

The present invention relates to autopilot control arrangements. The invention relates more particularly to an improved autopilot adapted for facilitating aircraft turns.

In a known aircraft control arrangement, stability of aircraft movement about a yaw axis is provided by means including a gyroscope having a response axis disposed in the direction of the aircraft yaw axis. With this arrangement, deviations about the yaw axis are sensed by the gyroscope and a correlation signal is generated thereby for effecting rudder control to reestablish the desired aircraft attitude. An aircraft turn is generally initiated by actuating a command transmitter which generates an electrical command signal corresponding to a desired rate of turn, $w$. This signal is applied to a torque motor which is coupled to and operates upon the yaw gyroscope. The output signal generated by the yaw gyroscope responsive to torque motor actuation is applied to a rudder control channel of the autopilot and the rudder is actuated accordingly.

In order to avoid sideslip or skid during a turn, it is desirable that the turn be coordinated. Turn coordination refers to establishing the apparent aircraft vertical in a perpendicular direction with respect to the transverse (pitch) axis of the aircraft, i.e., parallel to the aircraft yaw axis. Turn coordination is accomplished by carefully controlling the rate of turn, $w$, and the aircraft bank angle, $\gamma$. In a prior arrangement turn coordination is effected by controlling an aircraft roll gyroscope having a response axis disposed in the direction of aircraft roll. The roll gyroscope is also controlled by a torque motor to which a pulse-type signal is applied during a turn. The time integral of this signal is approximately proportional to the angle of bank $\gamma$ required for turn coordination. Additional exact turn coordination is effected by means including a lateral accelerator or apparent vertical pickup of a type described in German Pat. Specification 1,196,969, and U.S. Pat. No. 3,296,873.

Turn guidance of the type indicated under the control of the aircraft rudder is provided at relatively low flight speeds. At these speeds the inherent stability of the aircraft about its yaw axis remains relatively small. The rudder is thus effective in causing the necessary stabilization of the yaw axis and with the rudder there is also effected a turn guidance to which the relatively small aircraft bank has to adapt, true to the apparent vertical. However, at relatively higher flight speeds the relatively large normal forces occurring in a turn can only be applied by virtue of a relatively large bank.

Therefore, it is known to initiate the turn of an aircraft with a roll movement. To this end, the aircraft is initially caused to assume a bank relative to a vertical gyroscope indication and sideslips temporarily. Because of the sideslip, a torque becomes effective on the aircraft. Under the influence of the existing great weather vane stability, the aircraft rotates into a zero angle of sideslip and the turn guidance is primarily derived from the rudder. The rate of turn then results aerodynamically from the adjusted bank. However, the rate of turn, $w$, which results from a specific bank $\gamma$ according to the relation $$\tan \gamma = \frac{w \cdot v}{g}$$

depends on the flight speed $v$. The flight speed $v$, in turn, can be determined only with limited accuracy and in a relatively complicated manner from the dynamic pressure, the air pressure and the air temperature. In addition, the vertical indicating gyroscope is subject to a certain error during turns. It is therefore relatively difficult to achieve a desired rate of turn $w$ with satisfactory accuracy by virtue of adjustment of the aircraft bank angle $\gamma$.

It is an object of the present invention to provide an improved means for effecting the turn of an aircraft.

Another object of the present invention is to avoid the disadvantages occurring with prior art autopilots during turning flight.

It is a further object of the present invention to provide an autopilot which permits an accurate determination of the rate of turn at higher flight speeds.

It is a further object of the present invention to provide an autopilot in which the adjustment of the rate of turn can be accomplished irrespectively of the flight speed.

In accordance with a feature of the present invention, a rate of turn error signal ($x_{actual} - x_{setpoint}$) is derived from a yaw gyroscope and is applied with advance on the aileron channel for the control of the rate of roll. In the autopilot according to the invention there is effected a comparison of the turn command signal and rate of turn signal from the yaw gyroscope. The resultant signal, however, is not passed to the servomotor for the rudder, as is the case in the prior art autopilots, but rather is coupled to the aileron control channel. Thus, the initiation of a turn is effected by the aileron, however, with a closed servoloop, whereby the rate of turn can be determined accurately and independently of the flight speed. Since the rate of turn, and thus the change in the direction of trajectory results from the bank of the aircraft and occurs with a delay due to the mechanical and aerodynamic properties of the aircraft, it is important that the output signal of the yaw gyroscope be applied with lead to the aileron channel so as to compensate for this delay. It is further essential that the output signal is effective to control the rate of roll, that is, that the bank changes until the yaw gyroscope signal disappears. If the yaw gyroscope signal were effective to only define the bank, a finite difference of actual and setpoint rate of turn would generally correspond to a specific controlled bank.

The present invention is realized in one arrangement by coupling an output signal of the lead-forming yaw gyroscope system to a torque motor which acts on a roll gyroscope. The response axis of the roll gyroscope is disposed in the direction of the aircraft roll axis and an output signal thereof controls the servomotors for the ailerons.

In order to achieve a faster modification of the bank angle corresponding to a deviation of the rate of turn actual value, $w_{actual}$, from the setpoint value, $w_{setpoint}$, the output signal of the yaw gyroscope system is additionally applied directly to an amplifier in the aileron control channel.

When selecting a rate of turn command, in order to quickly obtain the required bank, the rate of turn command is also applied via a differentiating element to the torque motor of the roll gyroscope.

The present invention provides an autopilot which operates both in the low and in the high flight speed ranges in a manner corresponding to the respective conditions. In further modification of the present invention, this feature is attained by providing switching means whereby at relatively lower flight speeds the output signal of the yaw gyroscope is decoupled from the aileron channel and is applied to the servomotor of the rudder, while a lateral accelerometer signal is applied to the aileron channel. Thus, at relatively low flight speeds, a control is effected in the manner as described at the initiation of a turn with the rudder, for instance, in the manner described in German Pat. Specification 1,196,969 with a turn coordination provided by means including a lateral accelerometer.

An embodiment of the present invention will be hereinafter described with reference to the accompanying drawings, in which.

Figure 1:
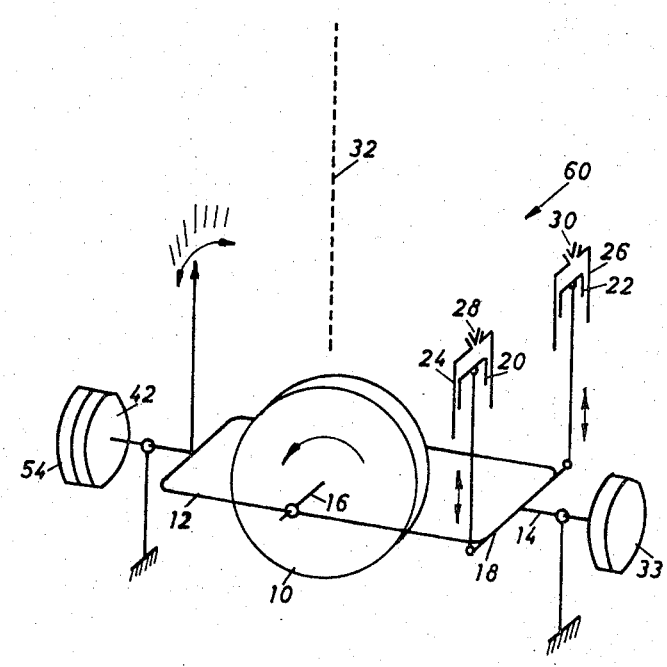
FIG. 1 illustrates schematically one of the three gyroscopes provided for the stabilization of the three aircraft axes.

In FIG. 1 the gyroscope rotor 10 is supported in a frame 12, the frame 12 in turn being pivoted about a precession axis 14 which is normal to the spin axis 16 of the gyroscope rotor 10. On the frame 12 there is mounted a crossbeam 18 normal to the precession axis 14. This crossbeam 18 has coupled thereto two pistons 20, 22 sliding in associated cylinders 24, 26, respectively. These cylinders communicate with the open air via two restrictors 28, 30. When a presession torque of the gyroscope occurs due to a rate of turn $w$ of the aircraft about an input axis 32, the crossbeam 18 rotates and air is compressed by one piston and is rarefied by the other one, acting on the gyroscope like a restraining spring. The associated angle of rotation of the precession axis 14 becomes proportional to the rate of turn 2 from this torque. At the same time air discharges from one of the cylinders 24, 26 through the restrictors 28 and 30, respectively, increasing the angle of rotation of the precession axis 14 proportionally to the time integral of the rate of rotation. Then, the total deflection A of the gyroscope corresponds to the relation:

$$A = Cw + C_o \int w dt.$$

Proportional pickoffs 33, 34 and 35 of the aircraft axis gyroscopes each supply a signal $\alpha_p$ proportional to the gyroscope deflection. The pickoff 33 is illustrated diagrammatically in FIG. 1. The signals $\alpha_p$ are supplied to associated summing amplifiers 36, 38 and 40, respectively (FIG. 2) of the autopilot and are used for aircraft attitude stabilization. A second pickoff 42, 44 and 46 for each aircraft axis gyroscope comprises an electrodynamic pickoff (differentiating pickoff) and supplies to the amplifiers 36, 38 and 40, respectively, an additional differentiated signal $\alpha_D$ used for the formation of a signal lead and thus for damping the control action. The pickoff 42 is illustrated diagrammatically in FIG. 1. With the aid of these two signals, $\alpha_p$ and $\alpha_D$, the aircraft is stabilized in its attitude about the respective response axis via an associated servomotor 48, 50 and 52 (not illustrated diagrammatically) coupled to a control surface. In addition each gyroscope includes a torque motor 54, 56 and 58, coupled to the gyroscope for rotation about the precession axis. The torque motor 54 is illustrated diagrammatically in FIG. 1.

Figure 2:
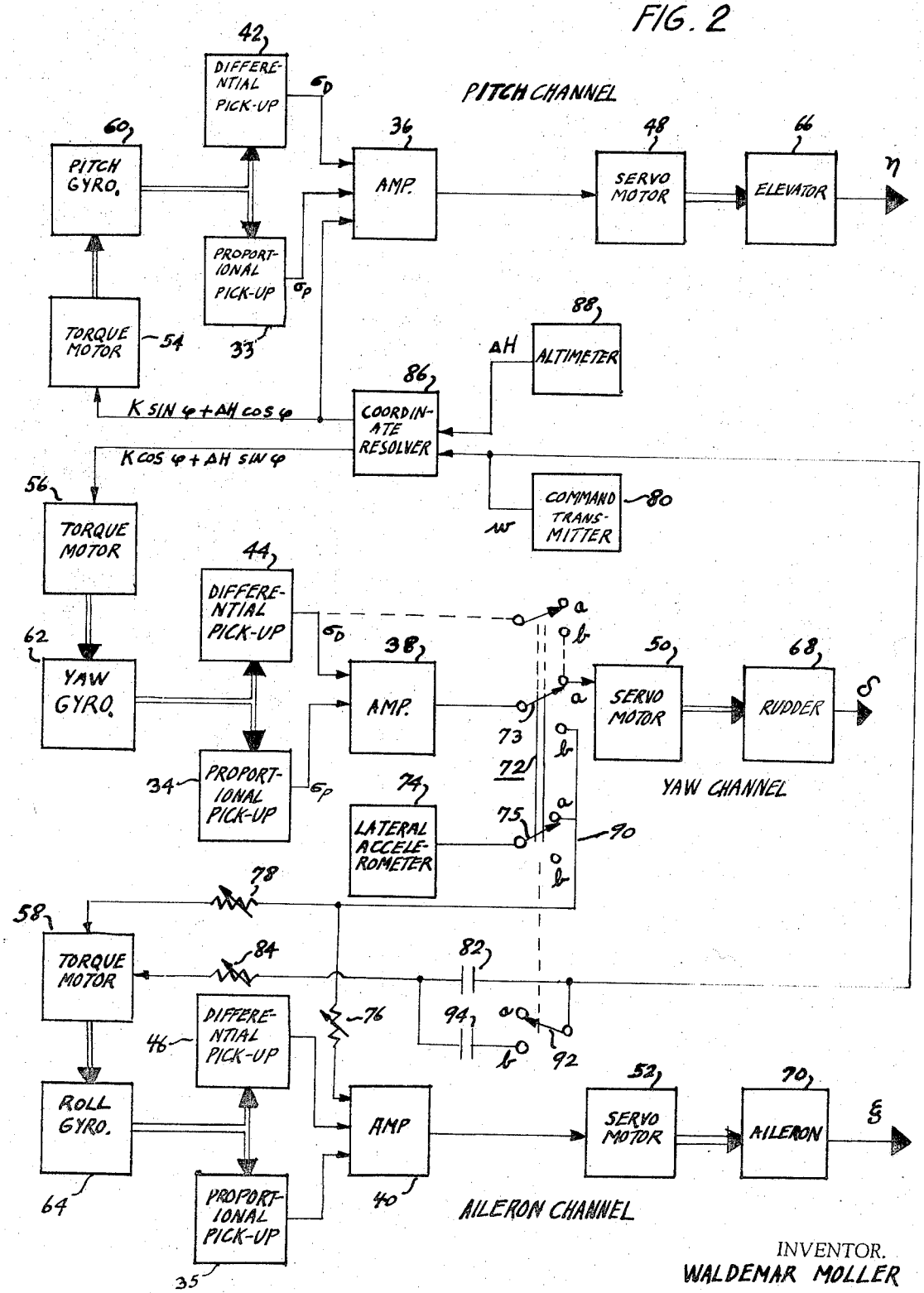
FIG. 2 is a block diagram of the pilot.

FIG. 2 illustrates a block diagram of the autopilot. For each of the three aircraft axes, that is the pitch axis, the yaw axis and the roll axis there is provided a gyroscope of the type described in FIG. 1. The response axis of the gyroscope 60 is disposed in the direction of the pitch axis, the response axis of a gyroscope 62 is disposed in the direction of the yaw axis, and the response axis of a third gyroscope 64 is disposed in the direction of the roll axis. With these three gyroscopes three control channels are provided for effecting aircraft stabilization about the three axes. Each of the gyroscopes respond to angular velocities about the axes and generate the signals $\alpha_p$ and $\alpha_D$ from the proportional and differentiating pickoffs as indicated hereinbefore. These signals are applied to associated amplifiers 36, 38, 40 and together through the action of associated servomotors 48, 50 and 52, respectively, effect a corresponding deflection of elevator, rudder or aileron control surfaces 66, 68 and 70, respectively, which counteract the attitude deviation. This is the common attitude stabilizing effect of the autopilot.

In the yaw channel there is arranged a switching device 72 at the output of the amplifier 38. This switching arrangement through a contact 73, when in position $a$, couples the yaw amplifier 38 to the rudder servomotor 50 for low-speed flight. While in this same switching position, a second contact 75 of the switchover device 72 couples a lateral accelerometer 74 to the roll channel. A signal of the lateral accelerometer 74 is thereby applied to the amplifier 40 of the roll channel through an adjustable resistor 76. At the same time, the signal of the lateral accelerometer 74 is coupled to the torque motor 58 of the roll gyroscope 64 through an adjustable resistor 78.

A command transmitter 80 is provided for initiating a turn. This signal source supplies a turn command proportional to the desired rate of turn. The turn command signal is coupled to the torque motor 58 of the roll gyroscope by a differentiating capacitor 82 and an adjustable resistance 84 as a pulselike signal, the time integral of which corresponds at least approximately to the angle of bank which is required for the rate of turn. $w$, adjusted on the command transmitter. As its principal function, however, the turn command signal is coupled into the yaw channel via a coordinate resolver 86 described hereinafter, and then to the torque motor 56 of the yaw gyroscope 62. Under the influence of the turn command on the torque motor 56, the yaw gyroscope 62 precesses and, in the switch position $a$, at relatively low aircraft speeds, effects a deflection of the rudder and thus an aircraft angle of incidence and a turn guidance. The aircraft flies a turn in a manner for providing that a precession torque caused by the aircraft rate of turn about the yaw axis is in equilibrium with the torque which becomes effective on the torque motor 56 from the turn command signal. Thus, the yaw gyroscope 62 serves to compare two rates of turn, namely the setpoint rate of turn $w_{setpoint}$ given by the turn command and the actual rate of turn, $w_{actual}$, actually carried out by the aircraft. The difference $w_{actual} - w_{setpoint}$ produces an output signal on the gyroscope, at the differentiating pickoff 44 with lead. Thus, in this mode of operation a rate of turn is initiated by the rudder 68. A pulse signal is applied to the torque motor 58 via the differentiating capacitor 82 and the signal of the gyroscope 64 effects a roll movement of the aircraft about an angle proportional to the time integral of the pulse signal and therewith to the turn command. Thus, by the pulse signal, the aircraft is caused to at first quickly assume a bank which at least approximately corresponds to the bank angle required for proper turn coordination. If the aircraft nonetheless still sideslips slightly or skids, this residual error will be eliminated by the lateral acceleration signal from the lateral accelerometer 74. This signal is applied on the one hand proportionally via the resistor 76 to the amplifier 40 and on the other hand is caused to become effective integratingly via the resistor 78 and the torque motor 58.

When the aircraft is in level flight, it is one function of the elevator to maintain a setpoint altitude. Deviations from the setpoint altitude are sensed by an altimeter 88 which then generates an altitude error signal $\Delta H$. The signal $\Delta H$ is applied to the pitch channel directly and thus proportionally to the amplifier 36 and integratingly to the torque motor 54 of the pitch gyroscope 60. If the aircraft flies in a bank which is significant, then the functions of elevator 66 and of rudder 68 will intermingle slightly (in the theoretical limit case of an angle of bank of 90° elevator and rudder would interchange their functions). Therefore there is provided the coordinate resolver 86 controlled by a vertical gyroscope (not shown), which applies the turn command K and the altitude error signal $\Delta H$ in the linear combinations $$K \sin \gamma + \Delta H \cos \gamma$$

and $$K \cos \gamma + \Delta H \sin \gamma$$

to the pitch and yaw channels respectively. This coordinate resolution also compensates for the fact that the turn command determines a rate of turn $w_{setpoint}$ which is related to earth coordinates, whereas the yaw gyroscope 62 supplies a rate of rotation $w$ about the yaw axis, and thus a rate of rotation in the coordinate system stationary with respect to the aircraft. This will be of significance hereinafter.

The type of turn initiation described hereinbefore via the rudder, as it is effected in the switch position $a$ of the switchover device 72 is substantially applicable at relatively low flight speeds, for example, at speeds shortly after takeoff. At these speeds the inherent stability of the aircraft (weather vane stability) about the yaw axis remains relatively small. It is necessary to stabilize the aircraft with the rudder 68, while, on the other hand, with a deflection of the rudder a rotation of the aircraft with the desired rate of turn can be effected. However, at high flight speeds different conditions prevail. At higher flight speeds a high weather vane stability of the aircraft about the yaw axis exists and it is not practically possible to initiate the turn solely with the rudder. The turn is initiated with a bank. The aircraft, by aerodynamic forces (weather vane effect) then executes the rotation corresponding to the bank.

At the higher flight speeds, the contacts 73 and 75 of the switching device 72 are switched to position $b$. In this switch position, the servomotor 50 is disconnected from the yaw channel amplifier 38 and then, under the influence of a position feedback, returns the rudder into zero position. Aircraft stabilization is then no longer provided by the rudder. At the relatively high aircraft speeds the inherent stability of the aircraft about the yaw axis substitutes for rudder stabilization. In switch position $b$, the lateral accelerometer 74 is also decoupled from the roll channel. Instead, an output of the amplifier 38, having supplied thereto as inputs the proportional and differential output signals of the gyroscope 62, is coupled to the roll channel. The amplifier 38 is coupled via the one contact of the switching device 72, a connection 90, and the resistor 76 to the input of the amplifier 40 in the roll channel. The amplifier 38 is also coupled via the resistor 78 to the torque motor 58 of the roll gyroscope. At the same time, a switch 92 which is mechanically actuated with the switching device 72 couples a capacitor 94 in parallel with the capacitor 82.

In this mode of operation, the turn command $K**x'_{setpoint}$ is also applied to the torque motor 56 via the coordinate resolver 86. The coordinate resolver produces a signal which corresponds to the rate of rotation $$w_{setpoint} = x'_{setpoint} \text{ cosine } \gamma$$

occurring at a rate of turn $x'_{setpoint}$ about the yaw axis, and the gyroscope compares this signal with the actual rate of rotation $w$. An error signal produced at the amplifier 38 is now dependent on the difference between these rates of rotation, the same, however, being applied with lead by the differentiating pickoff 44. The rate of turn error signal $x_{setpoint} - x'_{actual}$ and $w_{setpoint} - w_{actual}$, respectively, is utilized with this lead to initiate a bank of the aircraft in which the error signal disappears. To this end, the output signal of the amplifier 38 is applied to the torque motor 58 of the roll gyroscope, whereby a rate of roll of the aircraft corresponding to this output signal about its roll axis is initiated. The aircraft thus rotates about the roll axis until the signal on the amplifier 38 disappears. A proportional application of the signal from the amplifier 38 to amplifier 40 is provided via resistor 76. This proportional application is effective to cause a rate of turn error signal with a lead obtained by the differentiating pickoff and is effective directly on the ailerons 70. The proportional application thereby provides for the stability of the rate of turn control of the invention via the bank. The integrating application of the signal to the roll channel via the torque motor 58 acting on the gyroscope 64 is effective to cause a complete suppression of the error, eliminating any residual deviation. In addition, as described in the relatively low airspeed mode of operation, when switching on a turn command, a pulse signal is applied via the parallel coupled capacitors 82 and 94 to the torque motor 58, by which the aircraft is caused initially to at least approximately assume the proper bank. Because of the higher flight speeds at which the second mode of operation is used, the required bank is greater than at the lower speeds of the first mode of operation. The capacity of the differentiating element is thus increased by the parallel connection of the capacitor 94 via the switch 92.

Figure 3:
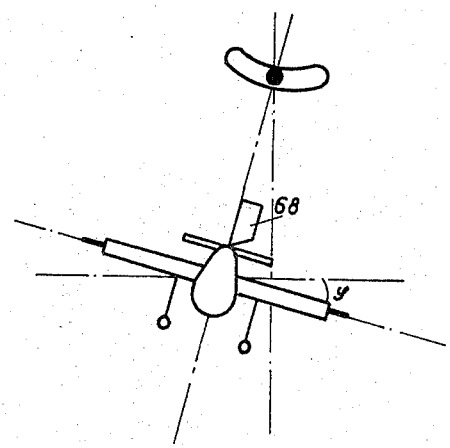
FIG. 3 and FIG. 4 show schematically an aircraft as seen from the front and from the top, illustrating the mode of turn guidance in the lower flight speed range.
Figure 5:
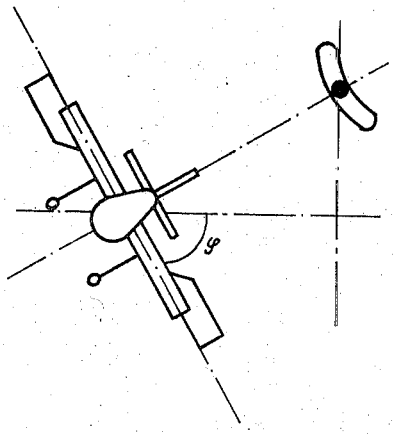
FIG. 5 and FIG. 6 are representations similar to FIG. 3 and FIG. 4, illustrating the mode of turn guidance at higher flight speeds.
Figure 4:
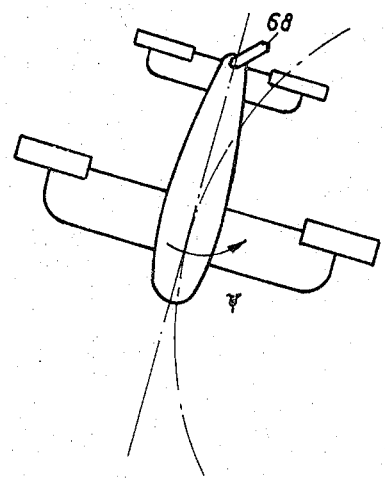
Figure 6:
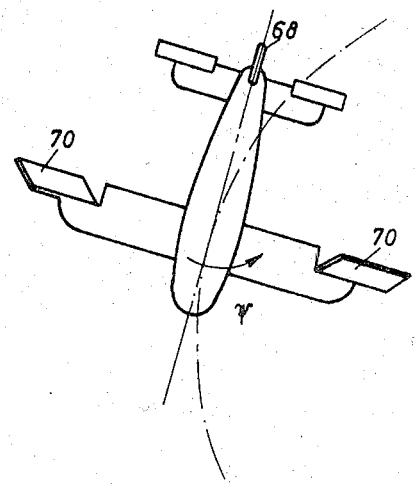

FIGS. 3 to 6 illustrate the two modes of operation and the references used. In FIGS. 3 and 4 the initiation of the turn is effected by the actuation of the rudder 68. In FIGS. 5 and 6 in a stronger bank $\gamma$ the rate of turn $w'$ is controlled by the actuation of the aileron 70. The rudder 68 is stationary.

In aircraft having a great weather vane stability at relatively high flight speed and having a small damping about the yaw axis, an additional damping of the yaw axis by the autopilot is desired when the switching device is in the switch position $b$. It is desirable, however, that this damping device should not counteract stationary rotations of the aircraft about its yaw axis, since the same would otherwise not adjust exactly into the weather vane direction in the turn. In this case, according to the present invention, and as is illustrated by the broken line showing the switching device 72 of FIG. 2 in the position $b$, only the differentiating signal $\alpha D$ of the turn gyroscope 62 is coupled to the servomotor 50 for the rudder responding only to the changes in the rate of rotation.

In contrast to prior turn controls in which the turn is initiated via the ailerons, according to the present invention there is effected a true control of the rate of turn with an actual value-setpoint value-comparison and a closed servoloop. With the autopilot as hereinbefore described it is possible depending on the flight speed to initiate turns either with the rudder or in controlled manner, with the ailerons. This control is effected using the available structural parts such as gyroscope, torque motor and amplifier so that only a single additional switchover device is required. The speed ranges in which a turn initiation may be accomplished according to the one or according to the other method merge into each other fluently, and there is an intermediate range in which both methods are applicable. Therefore, the point of switchover is not critical. A manual switchover may be effected. The switchover from one mode of operation to the other one, however, may expediently also be effected automatically, say, conjointly with the retraction of landing gear and landing flaps.

While I have illustrated and described a particular embodiment of my invention, it will be understood that various modifications may be made therein without departing from the spirit of the invention.

I claim:

1. An autopilot for an aircraft having yaw and roll axes and aileron and rudder control surfaces comprising:
   a yaw gyroscope having a response axis disposed in the direction of the yaw axis;
   a first torque motor coupled to said gyroscope for causing deflection of said gyroscope about a precession axis thereof in response to an input signal to said motor;
   electrical pickup means for providing proportional and differentiated output signals representative of deflection of said gyroscope about the precession axis;
   a rudder control channel including said yaw gyroscope, a rudder servomotor amplifying means and a rudder servomotor coupled in cascade;
   an aileron control channel including a roll gyroscope;
   an aileron servomotor amplifying means and an aileron servomotor coupled in cascade;
   said roll gyroscope having a response axis thereof disposed in the direction of the roll axis;
   a second torque motor coupled to said roll gyroscope for causing deflection of said gyroscope about a precession axis thereof in response to an input signal to said motor;
   a command transmitter for generating a rate of turn signal, $w$,
   first means for applying said signal $w$ to said first torque motor; and,
   second means for applying said yaw gyroscope output signals to said second torque motor and to said aileron servoamplifying means.

2. The autopilot of claim 1, including means for applying said differentiated signal to said rudder servomotor.

3. The autopilot of claim 1 wherein said second signal application means includes switching means for applying at relatively low aircraft speeds said yaw gyroscope output signals to said rudder servomotor and for applying at relatively high aircraft speeds said yaw gyroscope signal to said aileron control channel.

4. The autopilot of claim 3 wherein said switching means is adapted for coupling said differentiated yaw gyroscope signal to said rudder servomotor at relatively high aircraft speeds.

5. The autopilot of claim 4 including differentiating circuit means for applying said command signal $w$ to said second torque motor.

6. The autopilot of claim 5 including a lateral accelerometer and wherein said switching means is adapted for decoupling said yaw gyroscope signals from said aileron channel and for coupling said lateral accelerometer to said aileron channel at relatively low aircraft speeds.